(12) United States Patent
Gunawardana

(10) Patent No.: US 10,821,373 B2
(45) Date of Patent: Nov. 3, 2020

(54) EDUCATIONAL STORY TELLING TOY

(71) Applicant: Ruvinda Vipul Gunawardana, Easton, CT (US)

(72) Inventor: Ruvinda Vipul Gunawardana, Easton, CT (US)

( * ) Notice: Subject to any disclaimer, the term of this patent is extended or adjusted under 35 U.S.C. 154(b) by 62 days.

(21) Appl. No.: 16/033,150

(22) Filed: Jul. 11, 2018

(65) Prior Publication Data

US 2019/0022545 A1    Jan. 24, 2019

Related U.S. Application Data

(60) Provisional application No. 62/534,650, filed on Jul. 19, 2017.

(51) Int. Cl.
| | |
|---|---|
| *A63H 33/26* | (2006.01) |
| *H04R 1/02* | (2006.01) |
| *A63H 3/38* | (2006.01) |
| *G06F 3/16* | (2006.01) |
| *H04B 10/50* | (2013.01) |

(52) U.S. Cl.
CPC .............. *A63H 33/26* (2013.01); *A63H 3/38* (2013.01); *G06F 3/165* (2013.01); *H04R 1/028* (2013.01); *H04B 10/502* (2013.01); *H04R 2420/07* (2013.01); *H04R 2420/09* (2013.01)

(58) Field of Classification Search
None
See application file for complete search history.

(56) References Cited

U.S. PATENT DOCUMENTS

| | | | | |
|---|---|---|---|---|
| 4,521,205 A | * | 6/1985 | Spector | A63H 3/003 360/79 |
| 4,799,171 A | * | 1/1989 | Cummings | A63H 3/28 446/175 |
| 5,037,345 A | * | 8/1991 | Nakayama | A63H 3/24 446/297 |
| 7,035,583 B2 | * | 4/2006 | Ferrigno | G09B 5/062 434/308 |
| 2006/0078861 A1 | * | 4/2006 | Sabbagh | G09B 5/06 434/317 |
| 2006/0239469 A1 | * | 10/2006 | Gil | A63H 3/28 381/81 |
| 2007/0072513 A1 | * | 3/2007 | Rothmiller | A63H 3/02 446/369 |

(Continued)

*Primary Examiner* — Daniel Swerdlow

(57) ABSTRACT

The story telling toy contains one or more characters that relate an educational story upon power up. At least one of the characters has active facial features such as eyes and mouth that move synchronous to the audio. The audio as well as control signals for the actuated features are stored in a multi-track memory within the toy. Multiple short stories are saved in memory enabling the toy to relate a different story each time it is powered up. In another embodiment, the memory is made interchangeable by using USB drives, disks, SD cards, or other devices. The behavior of the toy changes when a new memory device is loaded and it relates different stories. In another embodiment, the toy may be designed to communicate with the home internet to enable downloading new stories via internet. The active features maybe implemented mechanically using electro magnets, solenoids, or optically using displays, electrochromic coatings, or fiber optic bundles.

8 Claims, 12 Drawing Sheets

(56) References Cited

U.S. PATENT DOCUMENTS

| | | | | |
|---|---|---|---|---|
| 2011/0124264 A1* | 5/2011 | Garbos | ................... | A63H 3/28 446/147 |
| 2012/0252306 A1* | 10/2012 | Chan | ....................... | A63H 3/20 446/90 |
| 2016/0158659 A1* | 6/2016 | Pradhan | ............... | A63H 13/005 446/175 |

* cited by examiner

EDUCATIONAL STORY TELLING TOY

TECHNICAL FIELD OF THE INVENTION

This invention relates to the general area of children's toys. Toys with human like features capable of talking and generating facial expressions have long been popular among children as these bring about greater reality into their imaginary world.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

In the prior art many designs with human like features with active facial features such as lips, jaws, eyeballs have been presented. U.S. Pat. No. 7,641,535 describes a passive mechanical eyelid mechanism to be used in plush toys. U.S. Pat. No. 4,846,693 presents a doll that interacts with a video shown on a VCR. The doll has actuated features in addition to audio and the control signals for the active features are embedded in the VCR signal. U.S. Pat. No. 4,923,428 presents a toy that has active features where the control for the active features combined with audio are stored in a tape. The toy selects an appropriate response based on the human's response to questions asked by the toy.

In most designs presented in the literature, the active features are actuated using motors. Among these, U.S. Pat. No. 4,665,640 presents a controller with a servo to control the movement of mouth mechanism that is synchronized to audio output. U.S. Pat. No. 6,089,942 present interactive toys, with active features, that communicate with each other using infra-red waves and listen to sound input from a microphone.

Another method to actuate active features is to use pneumatic cylinders. See for example, U.S. Pat. No. 4,177,589, which presents an artificial face that changes expression to match the sounds from an audio stream that is fed to a speaker located in close proximity to the face.

Another approach is to use optics to create the illusion of motion in active features instead of actually creating an active mechanism. U.S. Pat. No. 8,651,916 presents an artificial eye to be used in toys implemented with a display screen and a convex lens attached in front to make the eye realistic. The screen displays a sequence of images simulating the movement of the eye. U.S. Pat. No. 8,007,339 presents a virtual character in a transparent screen which responds to user input. The transparent screen is adjacent to one of two background screens and character response changes depending on which background is adjacent to the screen. U.S. Pat. No. 6,377,780 presents a device for displaying multiple scenes along with audio and a user selectable lighting sequence for each scene. U.S. Pat. No. 6,055,032 presents toy with a selectively populated grid matrix LCD to animate facial expressions. U.S. Pat. No. 5,098,302 presents an advertising display with two interlaced images that flash on alternating to make it more visually appealing.

In several designs the control signals for the active components as well as audio are stored in memory. U.S. Pat. No. 5,074,821 presents a design that uses a dual track memory for audio and control input for actuated joints. U.S. Pat. No. 4,775,352 presents a talking doll whose eyes and mouth can be controlled by a digital signal provided by a tape device which can store audio and corresponding eye and mouth movements to make the doll appear to talk.

Some of the designs present toys that are re-configurable to alter behavior by downloading different configurations into the memory that control the active features and audio. U.S. Pat. No. 6,012,961 presents a toy that is programmable where the audio and facial control signals can be downloaded to the toy from a computer. U.S. Pat. No. 8,287,372 presents an interactive toy system with a display and a console to control the virtual toy which maybe a virtual pet. The system includes a card reader and cards that change/configure the virtual toy. U.S. Pat. No. 8,684,786 also presents a reconfigurable talking toy.

One toy or a group of toys that tell a story can be interesting to a child and several such designs have been presented. U.S. Pat. No. 5,864,626 presents a group of toy dolls with audio capability that relates a story transmitted from a base unit. U.S. Pat. No. 6,227,931 presents a toy play house with sensors to detect multiple toy characters placed in it by a child. The toy has a speaker system that generates conversation based on the time of day and the location of toy characters that creates the illusion of the toy characters having real conversations. U.S. Pat. No. 8,277,221 presents an educational book and an accompanying soft toy which relates an audio message when a button is pressed upon cues in the book.

It is to these ends that the present invention has been developed.

BRIEF SUMMARY OF THE INVENTION

In this invention we present an educational toy that consists of one or more characters with active facial features such as eyes and mouth and a speaker that enable the toy to tell a story. The active features in the characters maybe implemented electromechanically using electromagnets, solenoids, or optically by using one or more display, interlaced optical fibers, or electrochromic coatings. The toy system contains a microprocessor together with memory to store the audio and control signals for active features corresponding to multiple stories. When powered up, the toy relates an educational story and the active facial features move in accordance with the story. When powered up a second time it relates a different story from a different location of memory. Many different stories are stored in memory enabling the toy to appear very realistic saying a different story every time it is powered up.

One implementation of the toy maybe as an alien character in a spaceship and the ship and character maybe placed in a transparent enclosure giving the appearance of the sip being levitated in air, The audio and control for active features maybe stored in a removable media such as a memory disk. In another embodiment, the toy will automatically use home internet access to download new stories. These features enable the toy to be upgraded with new stories. The story telling toy may also be implemented as an ipod or other hand held device application.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

This invention relates to the general area of children's toys. Toys with human like features capable of talking and generating facial expressions have long been popular among children as these bring about greater reality into their imaginary world.

This invention proposes a toy containing one or more characters that relate an educational story. The toy has active facial features such as mouth and eyes that move in accordance with the story. In other embodiments of this invention, the toy system may have additional characters with active facial features and join the story telling. The active characters may have other active body parts such as limbs also. The control signals for the active features will be interspersed with the audio signals and saved in memory in the toy.

Most current toys with active features utter the same phrase upon power up or in response to a user input. This causes children to lose interest in the toy after some time. The toy proposed in this invention will be programmed with many different short stories related to the same theme. Each time the toy is powered up or probed it will relate a different story. Due to the decreasing cost of memory, we can save a large number (fifty to hundred or more) of different short stories that will keep the user entertained. The toy system may be implemented with removable memory such as SD cards that will enable even more stories to be added. In another implementation, the toy can be designed to connect to the internet to program new stories automatically.

Figure 1:
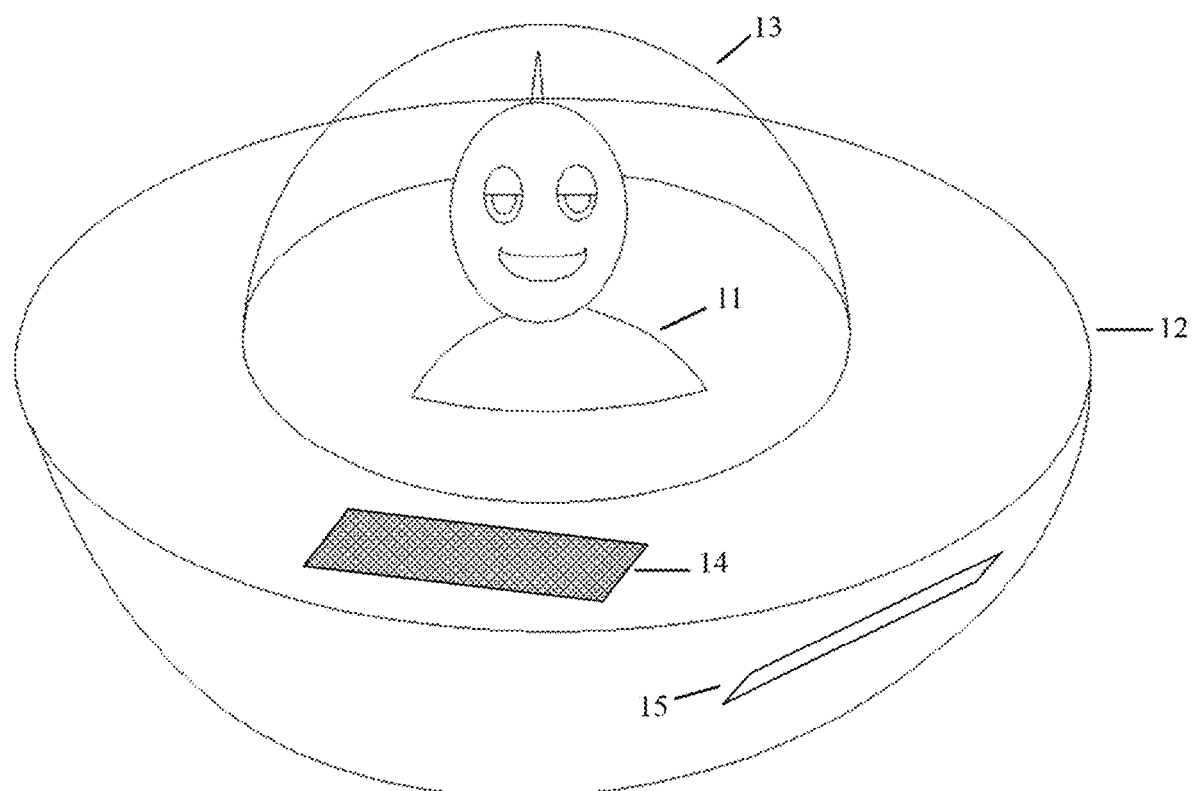
FIG. 1 is an example embodiment of the invention where the main character is an alien that tell stories related to his life in an alien planet. The alien character is in a space module with a transparent top. The main character has active features in his face (eyes and mouth) that move in synchronization with the audio.

FIG. 1 shows an example embodiment of this invention where the main character (11) is an alien. The stories in this case can be the alien talking about his life in another planet and what he saw during his journey to earth. The toy is designed in the shape of a space ship (12) with a transparent top (13) through which the main character can be seen. The actuators for the active features are embedded in the character and ship which also contain microprocessor and memory. The audio amplifier and speakers are also contained in the ship and the sound is emitted through grill (14). The memory can be removable enabling different stories to be uploaded in the same toy. The removable memory can be implemented using memory cards or small disks which can be inserted through a port (15).

Figure 2:
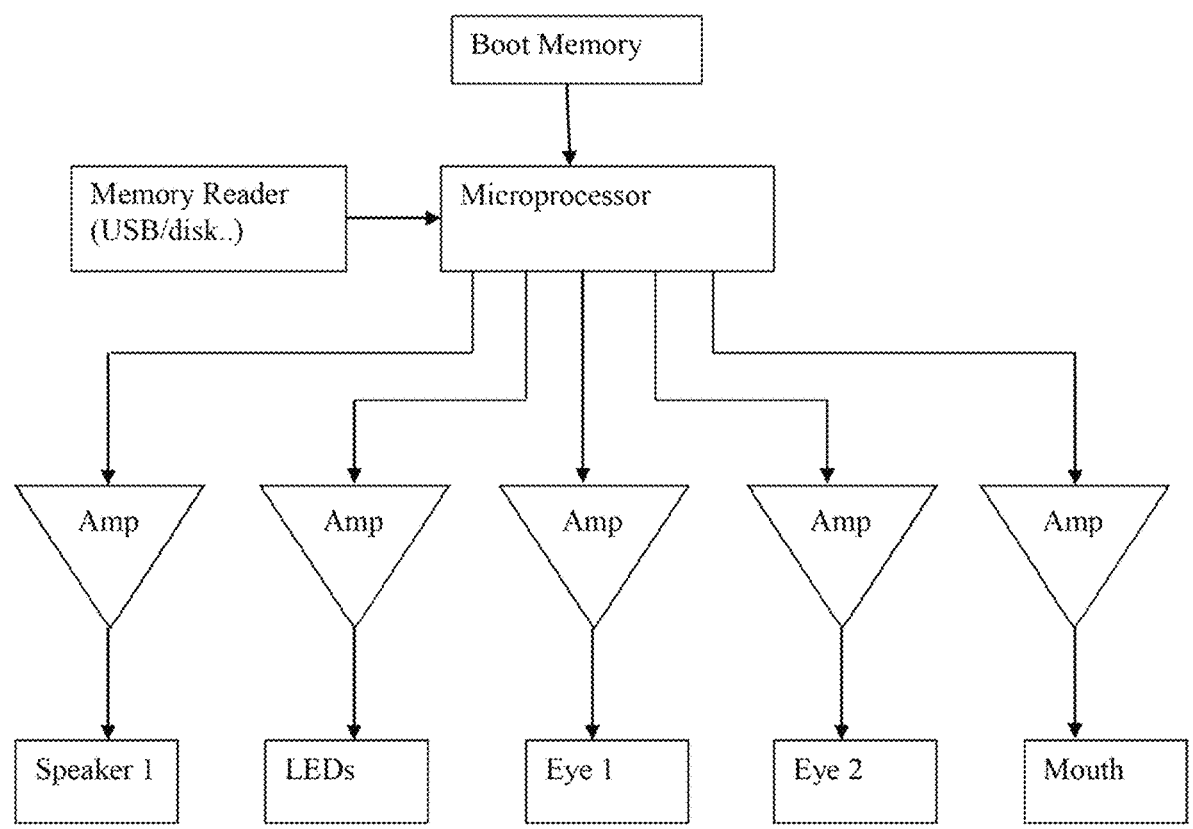
FIG. 2 shows a high level block diagram of the control system for the toy for one embodiment.

FIG. 2 shows a sample control circuit for the toy. The microprocessor or DSP boots upon power up and reads the next story from memory. The memory contains the audio as well as the control commands for the actuators corresponding to the story. In addition, the memory will contain the control commands for LEDs or other features of the toy enclosure. The control commands can be stored at the same frequency or at a lower frequency. At each sample time, the microprocessor transmits the audio through amplifiers to the speakers. The microprocessor also sends the commands to each actuator for the active features through amplifiers. The microprocessor may also do some processing of the signals read from the memory before transmitting to active features as needed.

Figure 3:
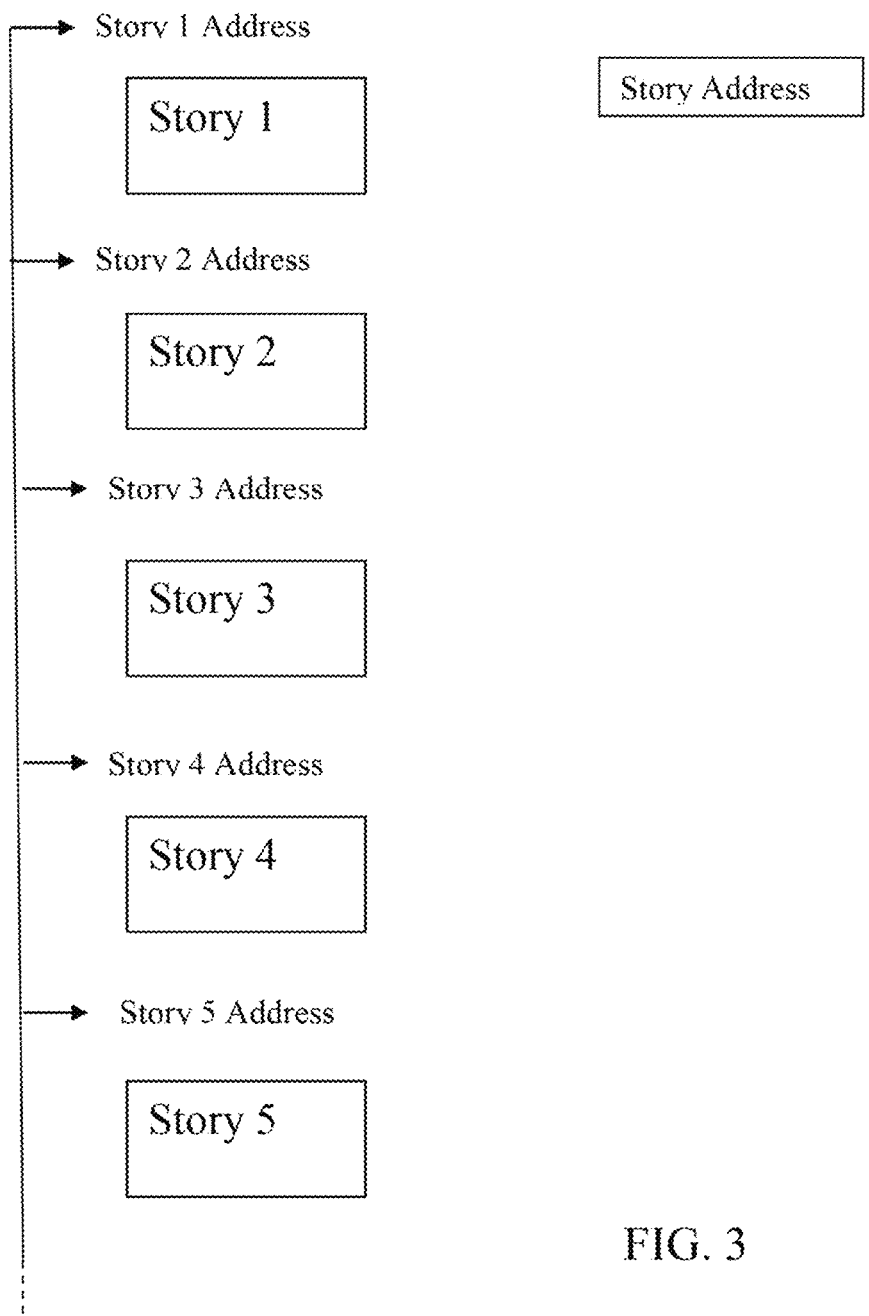
FIG. 3 shows the organization of the toy memory to enable it to tell a different story each time it is powered up.

The feature to relate a different story upon each power up can be implemented by organizing the memory to hold the stories at a fixed gap in memory as shown in FIG. 3. The starting address for each story is a constant gap from the previous story and hence, the program knows exactly where to find the next story. A location in memory is dedicated to save the address for the next story. Upon power up, the software reads the next story address and starts reading the current story from that address. It also updates the location where the next story address is stored with the address for the story after. Hence, when the toy is powered up next, it will read the next story. Other implementation can also include saving the addresses of the stories in an array enabling stories of different lengths to be programmed.

Figure 4:
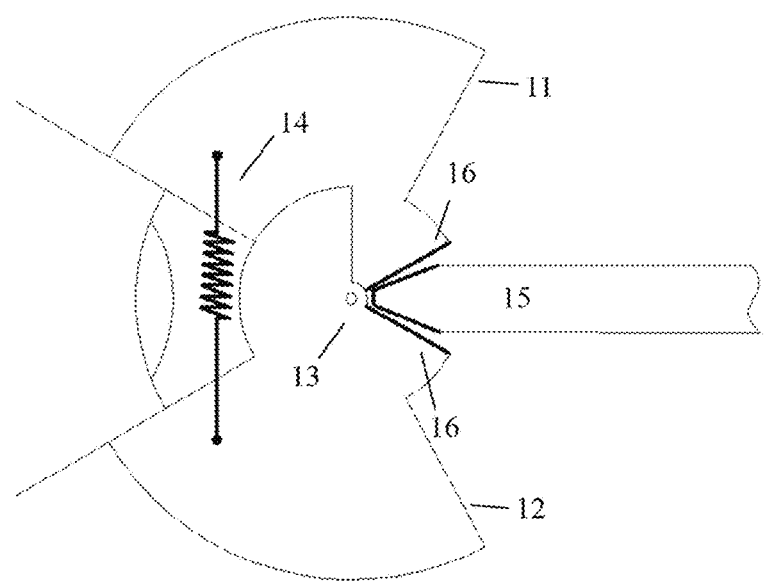
FIG. 4 shows one implementation of an eyelid mechanism using a spring and electromagnet.

The active features maybe implemented electromechanically using electromagnets and springs. FIG. 4 shows a sample implementation of an eyelid mechanism. In this mechanism the top eyelid (11) and the bottom eyelid (12) are designed to be mechanically movable between open and shut states by rotating about a common pivot axis (13). A spring (14) installed in the mechanism hold the eye lids in the default closed state. The mechanism has an electromagnet (15) and two ferromagnetic surfaces (16) on each eyelid that gets attracted by the electromagnet. As can be seen from the diagram when the electromagnet is actuated the top eyelid is pulled clockwise and the bottom eyelid is pulled counter clockwise opening the eye lids. Hence, in this mechanism the eyelids are closed when powered off open only when power is applied. The eyelid can also be implemented using a solenoid and a pivot mechanism similar to that shown.

Figure 5:
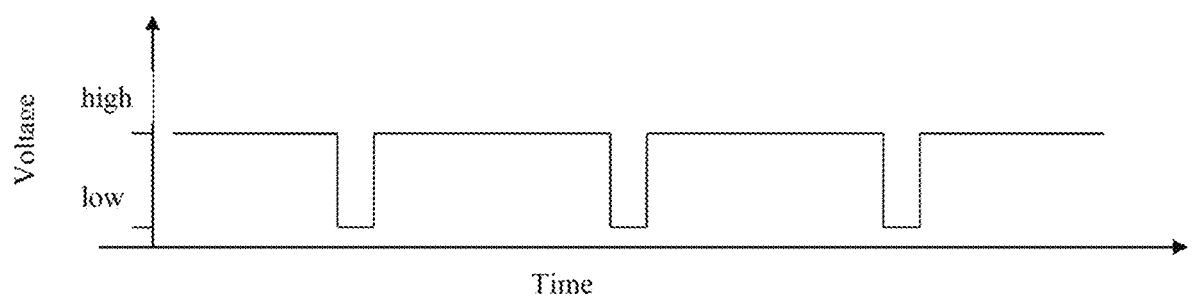
FIG. 5 shows an electrical waveform that would cause the eye lid mechanism of FIG. 4 to blink.

When you consider the waveform of FIG. 5, a high voltage is applied with periodic low voltage spikes. The high voltage state keeps the eyelids open and low voltage spikes will cause the eyelids to close momentarily and open. Hence, the waveform of FIG. 5 will cause the eyes to blink. The use of springs in conjunction with electromagnets will make the actuation silent as opposed to a motor which can be noisy. Note the magnets are attached close to the pivot point to reduce their travel since the magnetic force drops rapidly with distance. In a more advanced embodiment, the power level can have three levels, off, low power, and high power enabling the eyes to be opened wider to provide different expressions.

Figure 6:
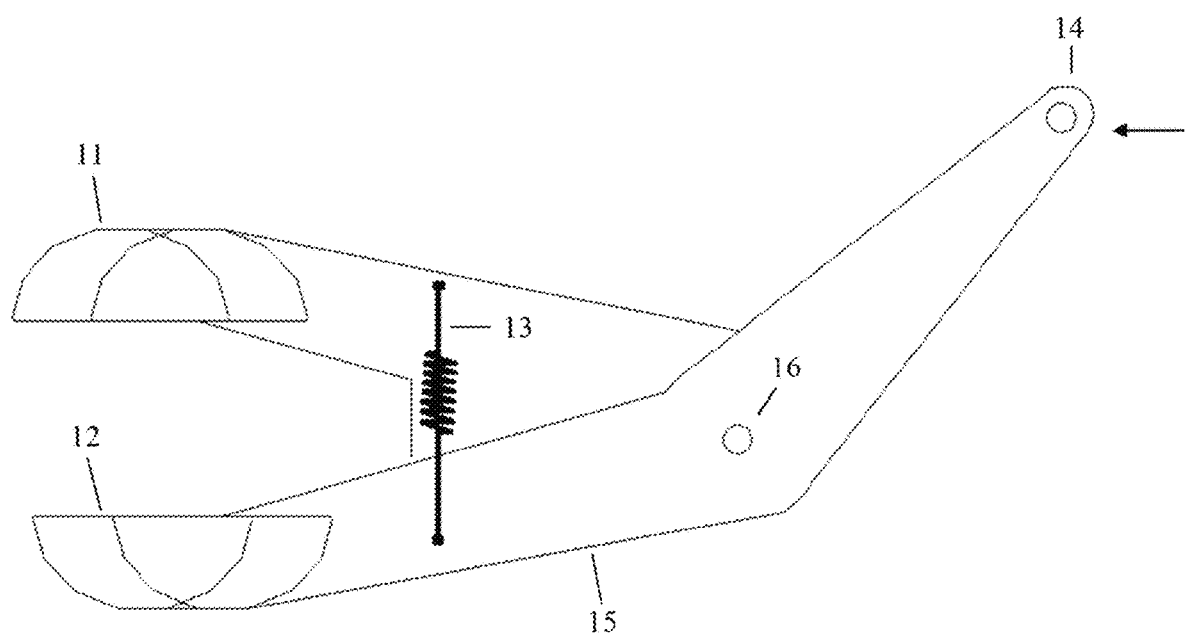
FIG. 6 shows an implementation of a mouth mechanism using a spring and electromagnet.

Other active features such as a mouth can also be achieved with an electromagnet and spring as shown in FIG. 6. The upper lip (11) is mounted to the head of the toy and the lower lip (12) is attached to a lever (15) that pivots about a pin (16) at the center of the lever. A spring (13) keeps the mouth shut when no power is applied to the toy. An electromagnetic actuator is attached to the opposite end of the lever (14) which pushes the lever in the direction shown when power is applied effectively opening the mouth. Similarly, limbs and face tilt motion can also be added electromechanically through magnets with springs, solenoids, or with DC motors if necessary.

Figure 7:
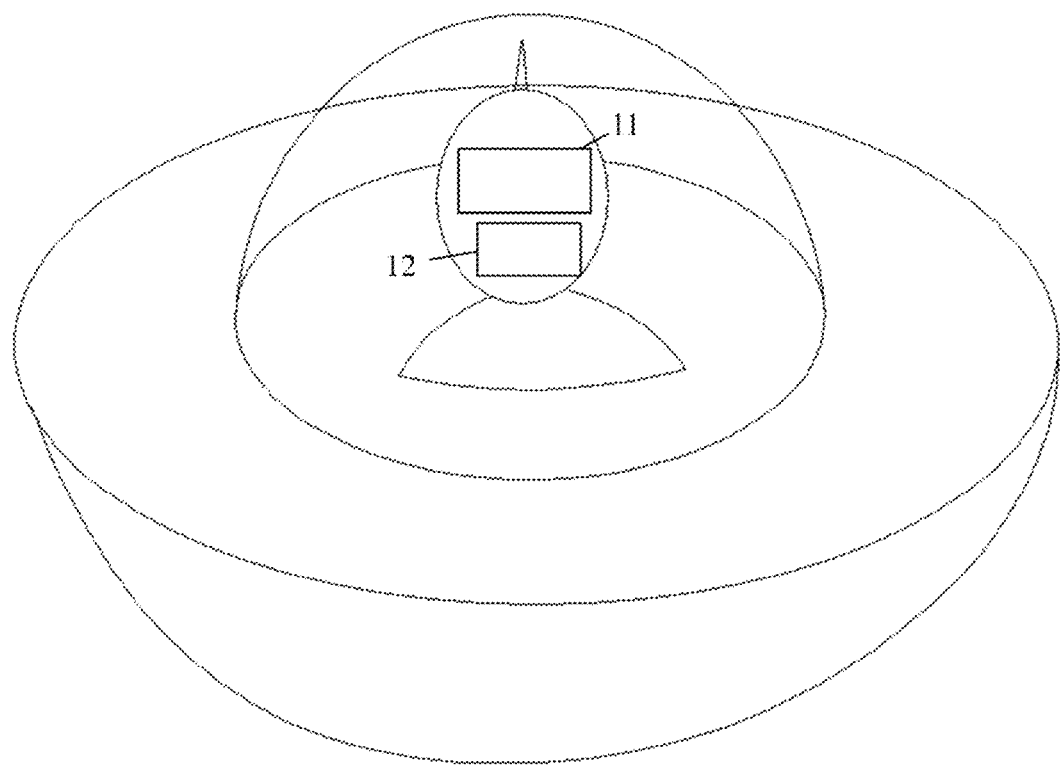
FIG. 7 shows an example of an alternative implementation of active features using displays for each character.

A second method that can be used to implement active features is to use one or more displays embedded in the toy at the location of moving parts. FIG. 7 shows an implementation of the main character using two LCD displays. A display is embedded at each active feature of the talking character (11, 12) and the character is displayed moving facial features in accordance with the audio.

Figure 9:
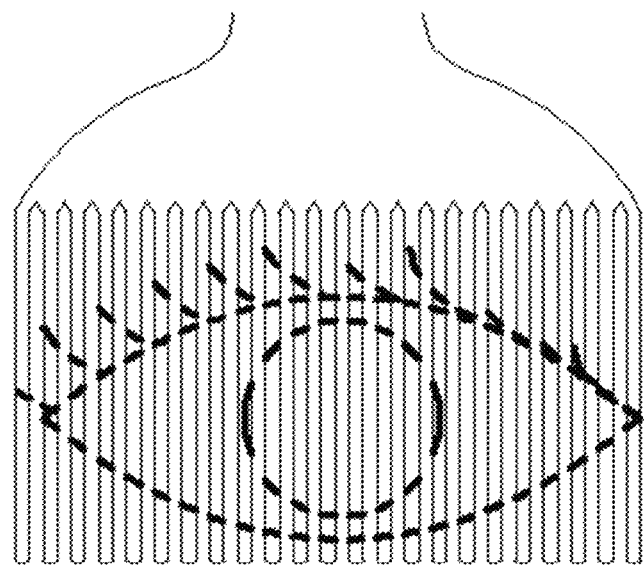
FIG. 9 shows a top fiber bundle with open eye drawn.
Figure 10:
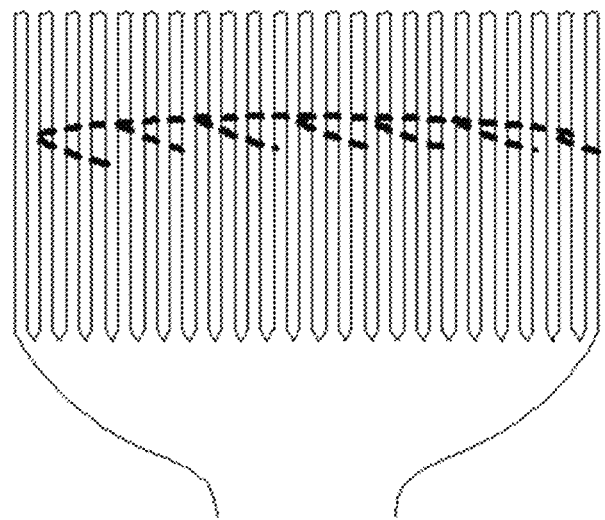
FIG. 10 shows a bottom fiber bundle with closed eye drawn.
Figure 11:
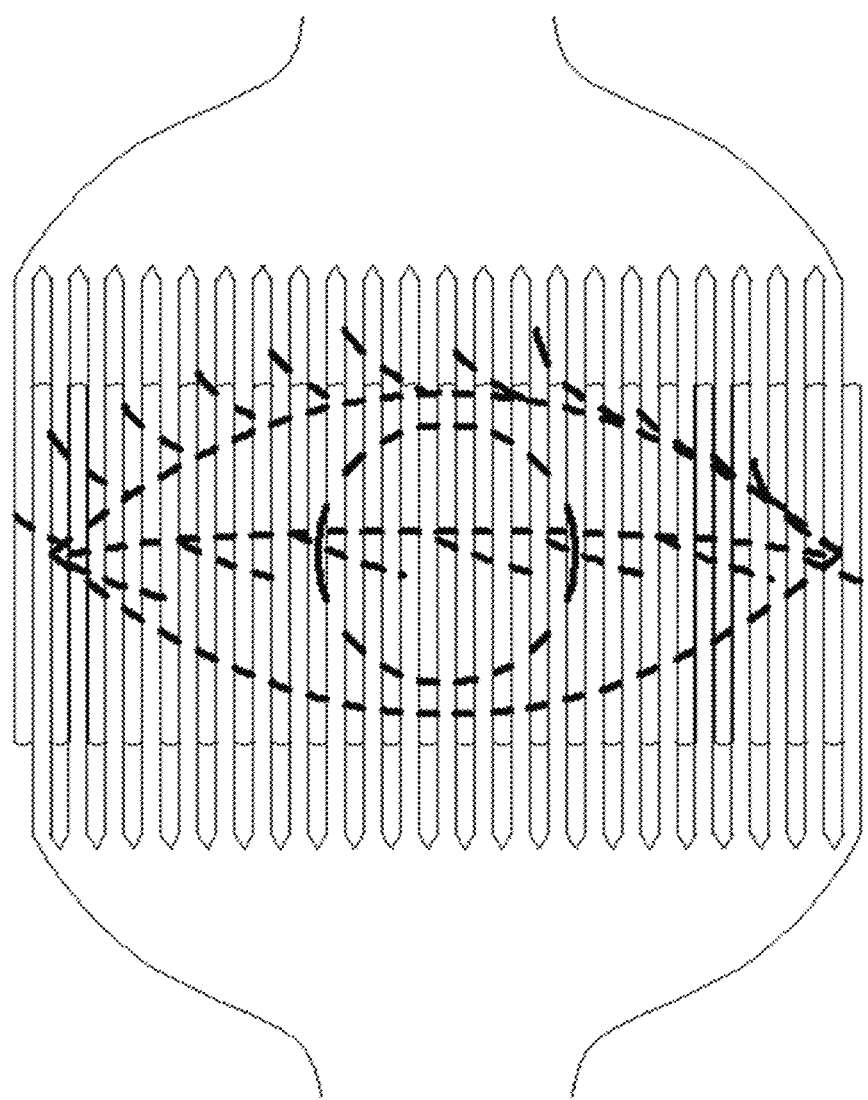
FIG. 11 shows the top bundle of FIG. 9 and bottom fiber bundle of FIG. 10 enmeshed. By illuminating each bundle alternatively, the illusion of the eyes opening and shutting can be created.
Figure 12:
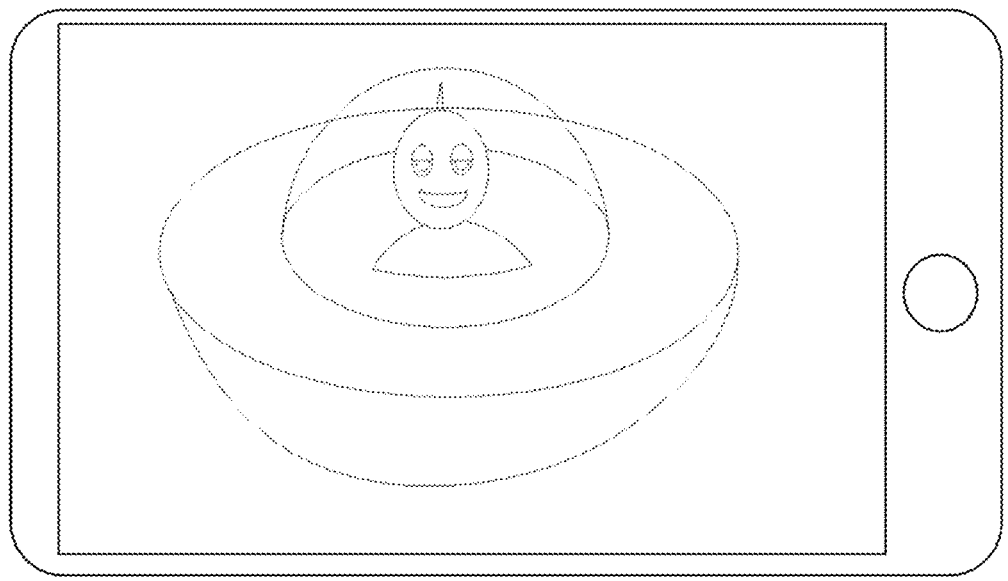
FIG. 12 shows the toy implemented in a hand held device as a software application.

A third method to implement active features involves the use of two inter-digitting sets of fiber optic bundles. The first bundle is arranged in a vertical array with a gap equal to the diameter of each fiber and bundled together at the top as shown in FIG. 9. A second bundle is arranged in a similar vertical array with a gap equal to the diameter of each fiber and bundled together at the bottom as shown in FIG. 10. The first bundle is illuminated from above and the second bundle is illuminated from below using LEDs. The active feature in one state is drawn on the first bundle (in this example an eye in open state) and in a second state (in this example an eye in closed state) in the second bundle. The two bundles are assembled together so that the two images are at the same location in space as shown in FIG. 11. When the first LED from above is turned on, the eye shows open and when the second LED from below is turned on the eye shows closed. This allows the eye to be displayed open or shut by illuminating the upper or lower LED. The display with the closed eye should be slightly in front of the other which would cause the eyes to appear closed when both LEDs are off.

Figure 16:
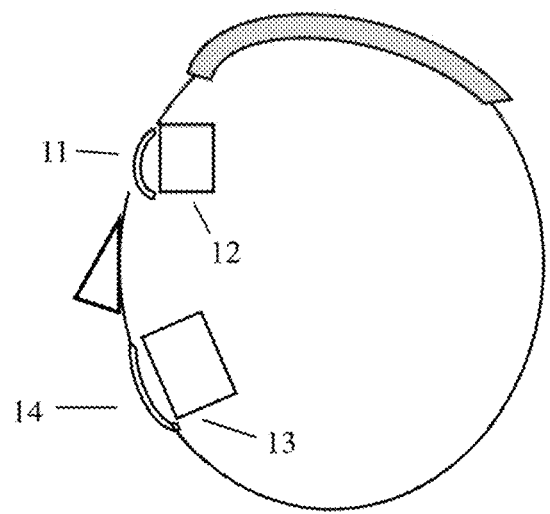
FIG. 16 shows an implementation of the active features, eyes and mouth, using electrochromic coatings. A thin sheet of plastic with an electrochromic coating is mounted in front of the eye. The illusion of opening and closing the eye is created by turning on and off the electrochromic coating.
Figure 17:
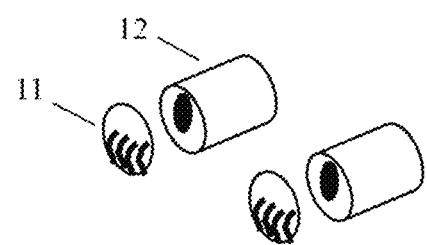
FIG. 17 shows the detailed implementation of the eyes using electrochromic coatings. An open eye is drawn on the front surface of an embedded cylindrical piece. A thin transparent plastic piece with an electrochromic coating depicting a closed eye is placed in front. When a voltage is applied to the electrochromic coating, the plastic sheet with the coating becomes transparent and the open eye behind become visible.

A fourth method that can be used to implement active features is to use an electrochromic surface in front of the active feature. FIG. 16 shows an implementation of an active eye and a mouth using electrochromic coatings. A thin sheet of transparent plastic with an electrochromic coating is mounted in front of the active feature. The active feature is drawn in one state (say closed) with the electrochromic material on the thin plastic sheet in front (11, 14) and in the other state (say open) on a piece behind (12, 13). The illusion of opening and closing the active feature is created by turning on and off the electrochromic coating. FIG. 17 shows the detailed example implementation of the eyes using electrochromic coatings. An open eye is drawn on the front surface of an embedded cylindrical piece (12). A thin transparent plastic piece with an electrochromic coating depicting a closed eye is placed in front (11). When no power is applied, the closed eye becomes visible. When a voltage is applied to the electrochromic coating, it becomes transparent and the open eye behind become visible. This creates the illusion of opening and closing eyes.

As mentioned previously, the control signals for the active features as well as audio are stored in a dual or triple memory track configuration of memory. The toy can be made to act different stories by loading different tracks. In one embodiment of the invention the toy will have a removable memory storage port such as a disk drive, USB port, or memory cards. The toy will be sold first with one disk. Additional disks will be sold next where each new disk will make the toy relate a complete different set of stories.

Figure 8:
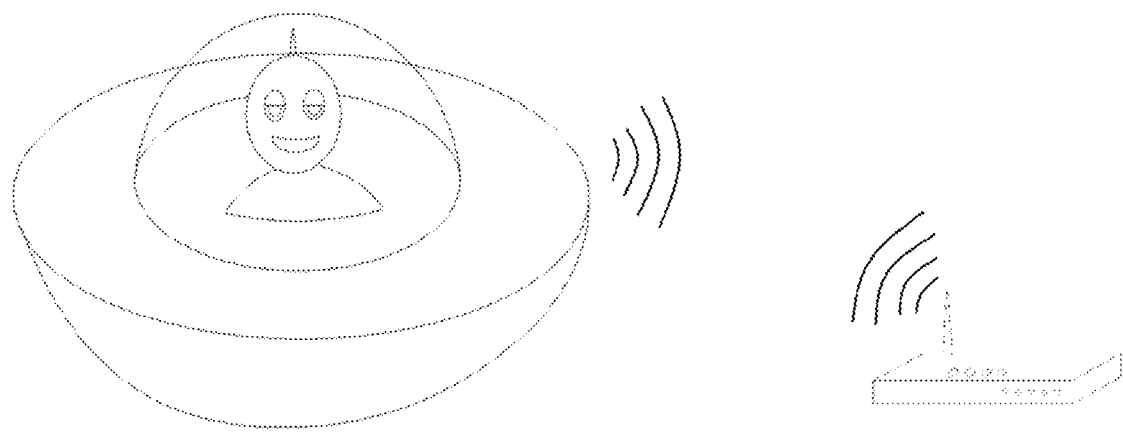
FIG. 8 shows toy implemented with a wireless receiver to connect to the home internet.

In another embodiment the toy will connect wireless to a home router or use blue tooth technology to upload different stories (See FIG. 8). In another embodiment the toy can be implemented as a software application that can run in an ipod or other hand held device. In this embodiment also new episodes can load automatically.

The capability for the system to recognize that it is being powered up too soon after the last shut down requires a signal that remains high for a period of time after the last shut down. The voltage $V_{CAP}$ at the capacitor in the circuit shown in FIG. 13 remain high for a period of time decaying to zero as shown in the top plot of FIG. 14 after power is shut down. The output of the comparator shown in FIG. 13, $V_{OUT}$ will be high if the system is powered up before time $T_D$ since $V_{CAP} > V_{REF}$. Note $V_{REF}$ can be generated with a simple voltage divider implemented with two resistors. If the system is powered up after time $T_D$, the comparator output $V_{OUT}$ will be low.

Figure 13:
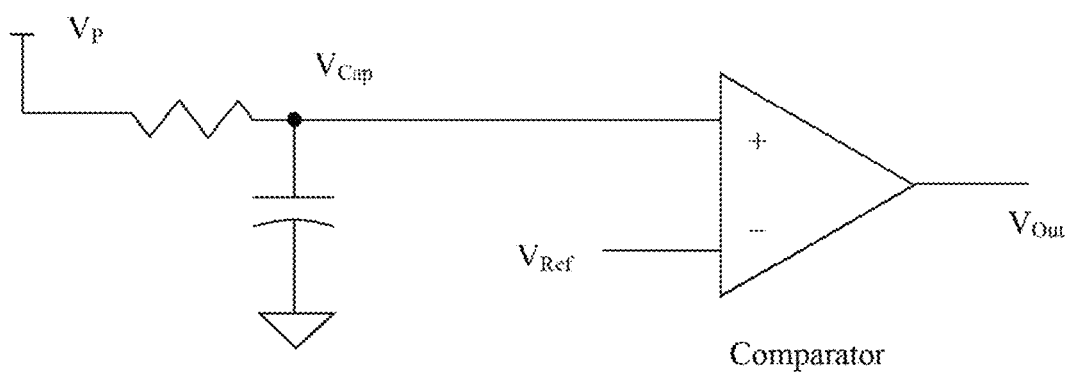
FIG. 13 shows a circuit that enables the toy to know if it was powered up too soon after the previous shut down.
Figure 14:
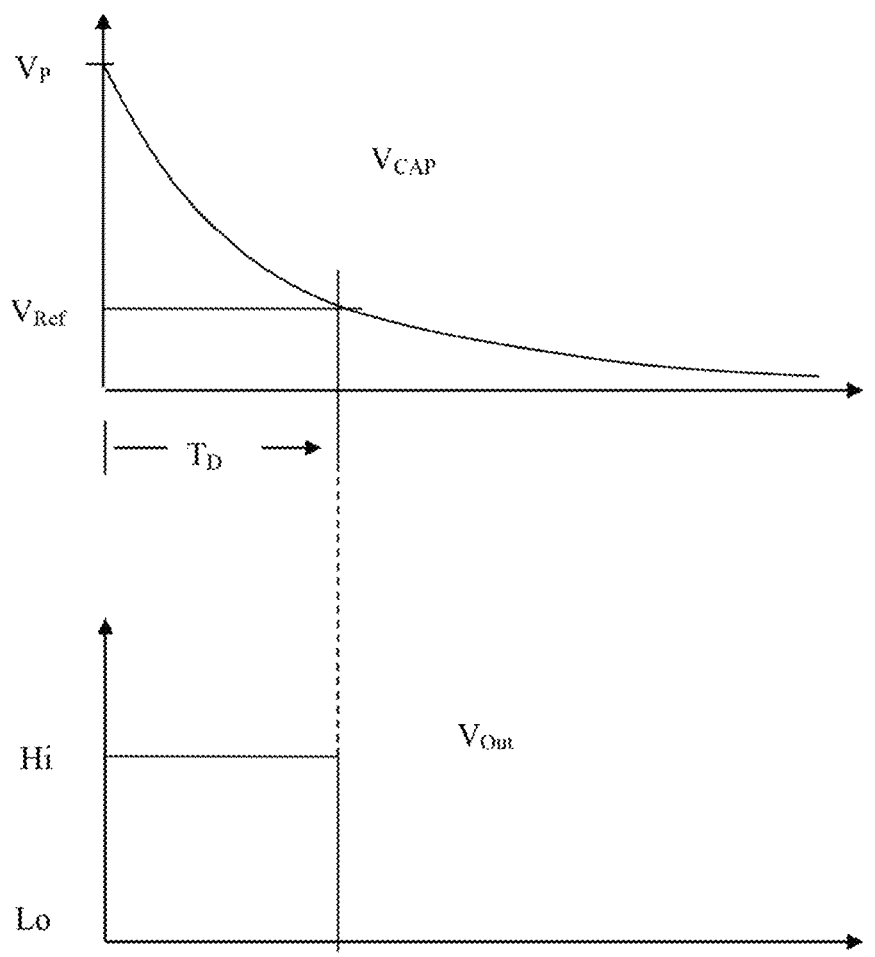
FIG. 14 shows the time response of the signals in the circuit of FIG. 13. The logic state of the signal $V_{Out}$ will be high if the toy is powered up soon after the previous shut down.

The allowed delay between power-up before the system complains, $T_D$, can be adjusted by selecting appropriate values of the resistor, capacitor, and $V_{REF}$ in FIG. 13. In the implementation of this functionality the comparator output, $V_{OUT}$, will be read by the microprocessor after power up and some appropriate small delay for the voltages to stabilize. If $V_{OUT}$ is high, the system will show an appropriate complaint that it was disturbed too soon. We can implement further interaction by keeping track of repeated disturbing by storing a count in flash memory and conveying increasingly annoyed messages.

Figure 15:
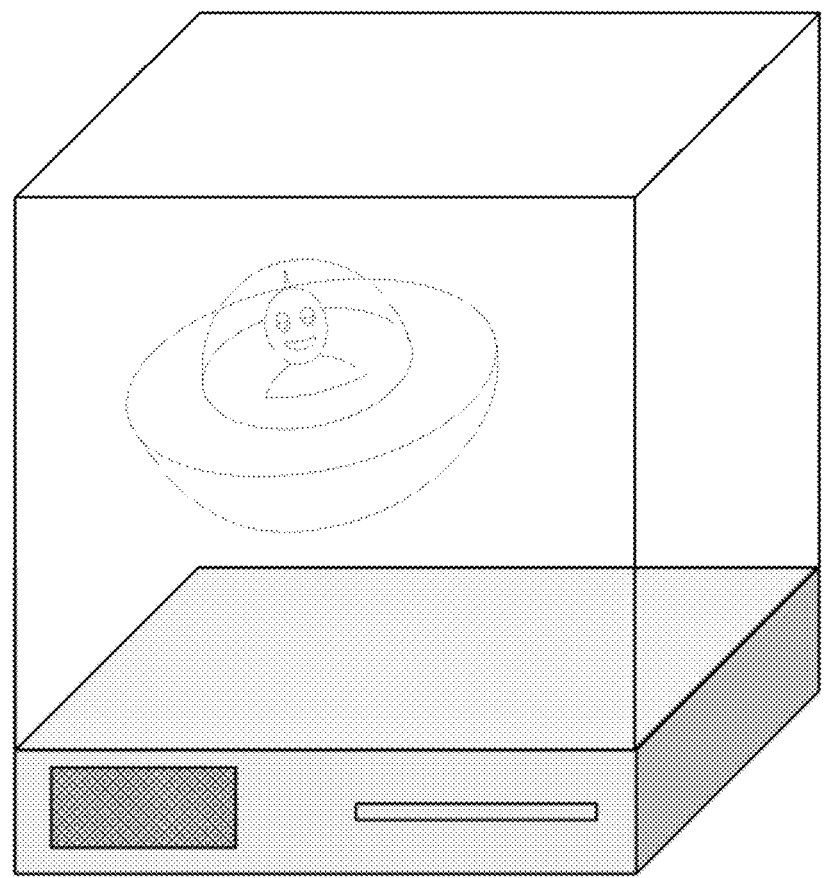
FIG. 15 shows an implementation of the toy as an alien in a spaceship where the ship appears to be levitated. The enclosure is made up of transparent plastic with the ship enclosed in the middle.

In one embodiment of the toy system, the lead character can be an alien in a space ship. The space ship can be made to appear levitated by embedding it in a transparent plastic housing as shown in FIG. 15. The electrical connections to the ship can be made from behind with the back wall colored black for example to hide the wires. In another embodiment the electrical signals may be transmitted wirelessly with electromagnets.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A children's toy system, comprising:
   an enclosure;
   a speaker;
   a control board including a microprocessor;
   a power source;
   a removable non-volatile memory card;
   a plurality of characters with active features;
   a plurality of audio stories stored in said non-volatile memory card;
   a circuit to detect whether said toy system is turned on before a predetermined time interval has elapsed after last shut down;
   a counter that tracks how many times said toy system is turned on before a predetermined time interval has elapsed after last shut down;
   a plurality of audio complaint files to play if toy system is turned on before a predetermined time interval has elapsed after last shut down;
   wherein said speaker, said control board, said power source, said a plurality of characters, and said non-volatile memory card are contained within said enclosure;
   wherein said non-volatile memory card is attached to said control board;
   wherein said speaker is attached to said control board;
   wherein said power source provides power to the system;
   wherein said removable non-volatile memory card contains multiple audio stories;
   wherein said non-volatile memory card contains commands for said active features corresponding to each of said audio stories;
   wherein a randomly selected audio story of said plurality of audio stories is played through said speaker when the system is turned on;
   wherein said active features display movement coordinated with said audio story based on said commands stored in said non-volatile memory card;
   wherein the toy system turns off automatically after completion of said audio story being played;
   wherein said another randomly selected audio story of said plurality of audio stories is read when the toy system is turned on again;
   wherein one of said plurality of complaint files is played if the system is turned on before a predetermined time interval has elapsed after last shut down;
   wherein said complaints become stronger if said internal counter shows increasing frequency of instances when said toy system is turned on before a predetermined time interval has elapsed after previous shutdown.

2. The invention of claim 1,
   wherein said active features are implemented optically using a pair of inter-digiting optical fiber bundles illuminated with LEDs on which the two states of the active feature are drawn; and
   wherein the one state of the active becomes illuminated and visible when one LED is turned on and the second state becomes visible when the other LED is turned on.

3. The invention of claim 1,
   wherein said active features are implemented using an electrochromic coating where the default state of the feature is drawn on the electrochromic coating and the second state is drawn on a surface behind the coating;
   wherein the default state of the active feature is visible when no power is applied to the electrochromic coating; and
   wherein the electrochromic coating becomes transparent when power is applied, and the second state of the active feature drawn on a surface behind becomes visible.

4. The invention of claim 1,
   wherein said active features are implemented using solenoids.

5. The invention of claim 1,
   wherein said power source is removably attached batteries.

6. The invention of claim 1,
   wherein said power source is a power cord.

7. The invention of claim 1,
   wherein said wireless device comprises internet connectivity.

8. The invention of claim 1,
   wherein said wireless device comprises Bluetooth connectivity.

* * * * *